United States Patent [19]
Lynch

[11] Patent Number: 5,322,734
[45] Date of Patent: Jun. 21, 1994

[54] OXIDATIVELY-STABILIZED POLY(VINYLMETHYLETHER) FOR HOT-MELT ADHESIVES

[75] Inventor: Tsuei-Yun Lynch, Naperville, Ill.

[73] Assignee: Amoco Corporation, Chicago, Ill.

[21] Appl. No.: 34,258

[22] Filed: Mar. 22, 1993

[51] Int. Cl.$^5$ ............................. C08K 5/3437
[52] U.S. Cl. .................. 428/349; 428/511; 524/87; 524/120; 524/147
[58] Field of Search ............. 524/87, 120, 147, 153, 524/351, 345; 428/509, 512, 513, 349, 348, 511; 526/332

[56] References Cited

U.S. PATENT DOCUMENTS

| | | | |
|---|---|---|---|
| 2,697,084 | 12/1954 | Eger | 526/332 |
| 2,970,974 | 2/1961 | Albus et al. | 524/270 |
| 2,985,617 | 5/1961 | Salyer et al. | 524/399 |
| 3,620,824 | 11/1971 | Slade et al. | 524/87 |
| 5,080,978 | 1/1992 | Kulzick et al. | 428/483 |

OTHER PUBLICATIONS

Auxiliary Substances for Polymeric Materials–K. B. Piotrovskii et al (1966) pp. 19 and 20.
F. Mitterhofer–Polymer Engineering and Science, mid Jul., 1980, vol. 20, No. 10.

*Primary Examiner*—Veronica P. Hoke
*Attorney, Agent, or Firm*—Wallace L. Oliver

[57] ABSTRACT

An oxidatively stabilized adhesion promoter composition for hot-melt adhesives is disclosed. The oxidatively stabilized adhesion promoter composition comprises a poly(vinylmethylether), said poly(vinylmethylether) having a number average molecular weight of from about 5,000 to about 1,000,000, and an oxidative stabilizer antioxidant consisting of polymerized 1,2-dihydro-2,2,4-trimethylquinoline having a number average molecular weight of from about 350 to about 750. The said polymerized 1,2-dihydro-2,2,4-trimethylquinoline can be used with a secondary antioxidant comprising an organic compound of sulfur and trivalent phosphorus. The trivalent phosphorus compound can be a phosphite selected from the group consisting of tris-(2,4-di-tert-butylphenyl) phosphite, tris(mono-nonylphenyl) phosphite, bis(2,4-di-tert-butylphenyl) pentaerythritol diphosphite, distearyl pentaerythritol phosphite, and mixtures thereof. The oxidative stabilizer antioxidant is present in the poly(vinylmethylether) in an amount from about 0.01 weight percent to about 2.0 weight percent. The oxidatively stabilized adhesion promoter composition can contain up to about 1000 parts per million of hydroperoxides measured at room temperature and has a carbonyl index of less than about 2.9 as measured by infrared spectroscopy after exposure to a high temperature for a prolonged period.

13 Claims, No Drawings

OXIDATIVELY-STABILIZED POLY(VINYLMETHYLETHER) FOR HOT-MELT ADHESIVES

BACKGROUND OF THE INVENTION

This invention relates to oxidatively stabilized adhesion promoters for hot-melt adhesives which comprise stabilized poly(vinylalkylethers) of improved oxidative stability containing an initial level of hydroperoxides up to about 1000 parts per million before exposure to elevated temperatures. The oxidatively stabilized poly(vinylalkylethers) have a carbonyl index of less than about 2.9 after exposure to high temperatures for prolonged periods. The oxidatively stabilized polymers have a number average molecular weight of from about 5,000 to about 100,000 and contain from about 0.01 weight percent to about 2.00 weight percent of polymerized 1,2-dihydro-2,2,4-trimethylquinoline as an oxidative stabilizer and antioxidant. Secondary antioxidants such as organic compounds of sulfur and trivalent phosphorus are optionally present.

This invention also relates to improved hot-melt adhesive compositions effective in binding polyolefins to themselves and to other materials which are based upon an oxidatively-stabilized poly(vinylalkylether) and, more particularly, to hot-melt adhesive compositions which strongly bind polyolefins, in particular polyethylene, polypropylene, and ethylene-propylene copolymers, to themselves and to other substrates including Kraft paper, burlap, glass and metals, and which are formulated from an oxidatively-stabilized poly(vinylmethylether) (PVME) a thermoplastic resin, and, optionally, a tackifier resin. The PVME is stabilized against color degradation under prolonged heat at elevated temperatures.

Polyvinyl alkyl ethers are known to be subject to oxygen, heat, and light and to suffer depolymerization or breakdown in molecular weight to lower molecular weight polymers and to the alcohols from which the monomers are derived. The alcohols can further oxidize to aldehydes, ketones and acids. A number of stabilizers and antioxidants have been proposed to overcome the influence of oxygen, heat and light which cause chain cleavage, cross-linking and reactions with oxygen. These aging processes affect the polymer's adhesive properties and can cause degradation of the polymer to form a gel-like substance and/or a skin formation.

It has been taught, U.S. Pat. No. 2,985,617, that polymers of 2-3 carbon atoms such as polymerized vinyl ethers prepared by use of a Ziegler catalyst, such as the material formed from a trialkylaluminum with titanium tetrachloride, can be stabilized against the effect of thermal processing by a small amount of a polyvinyl chloride heat stabilizing agent selected from the group consisting of alkaline earth metal salts, epoxidized organic oils and esters, epoxy resins, organo-tin compounds, organo-lead compounds, organic phosphites, and substituted ureas. Weak bases are taught as being useful in stabilizing polymers of 2-3 carbon atoms against the effects of thermal processing.

U.S. Pat. No. 2,521,950 teaches that incorporation of small amounts of p-hydroxy-N-phenylmorpholine in polymerized vinyl alkyl ethers can retard depolymerization of these polymers by heat. However, the use of this compound as a stabilizer suffers from the disadvantage of discoloration of the polymer. The addition of an amount of an alkali so that the polymer has a pH value of at least 9 as measured by a glass electrode is taught as a means of improving the color of the polymer containing the heat stabilizing compound.

Polymerized 1,2-dihydro-2,2,4-trimethylquinoline is known in the art as a stabilizer of polyesters for protection against degradation due to heat and oxygen but discoloration of the stabilized polyester occurs. For example, U.S. Pat. No. 3,620,824 teaches use of 2,2,4-trimethyldihydroquinoline to stabilize polyethylene terephthalate modified with polyethers such as methoxy polyethylene glycol. The presence of a alkylated hindered bisphenol is required to prevent the discoloration of the stabilized polyester caused by the use of 1,2-dihydro-2,2,4-trimethylquinoline.

Hot-melt adhesives containing polyvinylmethylether are known in the art. U.S. Pat. No. 2,970,974 teaches a hot-melt adhesive compatible composition consisting essentially of up to 75 wt. percent poly(vinylmethylether) and a modifying agent selected from the group consisting of rosin and ester derivatives thereof. U.S. Pat. No. 5,080,978 teaches a hot-melt adhesive comprising a poly(vinylalkylether), preferably a poly(vinylmethylether), and a thermoplastic resin selected from the group consisting of $C_2$ to $C_6$ polyolefins and copolymers. Other examples of polyolefins utilized in hot-melt adhesives are ethylene-vinyl acetate copolymers and styrene-isoprene block-copolymers.

Because of their attributes, it is expected that hot-melt adhesives will tend to be more the adhesive of choice in high speed packaging operations. Increase in packaging line speeds to 400 or more cartons per minute has made instant setting adhesives essential. Hot melt adhesives with improved characteristics are therefore of continuing interest.

Hot melt adhesives are typically used or applied at temperatures of from about 170° C. to about 210° C. They are therefore subject to decomposition as evidenced by the development of discoloration, skinning, charring or change in viscosity. The purpose of an antioxidant is to maintain the original properties of the hot-melt adhesive, so as to be thermally stable and permanent. The loss of antioxidant activity from hot-melt adhesives therefore can reduce the utility of the hot-melt in a typical application.

Hot-melt adhesives can be prepared in granular form, lump form or as a rope-like material. They can be applied to the substrate by several different methods. Frequently, the hot-melt adhesive is made fluid by heating in a large feed-stock vessel. The hot-melt adhesive is then applied to the substrate with the aid of rolls or pumps. Pot life of the hot-melt adhesive, i.e., the hot-melt adhesive remaining fluid at the elevated temperature for long periods of time without depolymerizing or discoloring or developing a skin, becomes of critical importance in maintaining packaging line speeds and product quality.

Polyethylene, polypropylene, and ethylene-propylene copolymers are widely used in many applications which require adhering these plastics to themselves as well as to other materials. However, adhesives do not form strong bonds to untreated polyolefin surfaces. The difficulties encountered in developing adequate adhesion to polyethylene and polypropylene can be attributed in large part to the non-porous and non-polar characteristics of these materials. In addition, the presence of surface materials such as mold release agents, slip agents, antioxidants, polymerization impurities, and low-molecular-weight surface polymers further deteriorates surface conditions for adhesion. Various surface preparation procedures, including etching with sodium dichromate-sulfuric acid solution, treating with flame, corona discharge, electron beam, laser light, ultraviolet radiation, hot chlorinated solvent, and applying chemically reactive primers have been developed to afford a polyolefin surface that is more receptive to conventional adhesives. However, such pretreatment adds significant cost to a finished assembly and can reduce the economic incentive to use polyethylene or polypropylene in place of more expensive plastics. Further, some surface treatment procedures, e.g., corona discharge, are only applicable to thin, flat surfaces and cannot be used in many existing applications.

Poly(vinylalkylethers) have been widely used in adhesive formulations, the specific alkyl group of methyl, ethyl, isopropyl, n-butyl, isobutyl, t-butyl, stearyl, benzyl and trimethyl determining to a large extent the hot-melt adhesive application. Of the alkyl groups, the methyl ether compound offers a larger potential number of applications as a component of a hot-melt adhesive formulation. Improvement of poly(vinylmethylether)-based hot-melt adhesives by use of an oxidatively-stabilized poly(vinylmethylether) to reduce tendency to oxidative degradation and gel and skin formation will therefore be of wide utility in the art because of the large number of possible applications. Typical applications for poly(vinylmethylether) will be in bonding polyethylene, polypropylene and ethylene-propylene copolymers.

A hot-melt adhesive with improved oxidative resistant properties which strongly bonds untreated polyethylene, polypropylene, and ethylene-propylene copolymers would represent a significant achievement and present opportunities to not only market a new family of adhesives, but also open many new markets for such polyolefins in the areas of automobiles, appliances, fabrics, etc. Additionally, hot-melt adhesives with improved oxidative-resistant properties such as with use of the invented composition would find extensive use with other substrates.

Poly(vinylalkylethers) and particularly poly(vinylmethylether) have long been used in hot-melt adhesive formulations with many different antioxidants. One such antioxidant is the 3.5-di-tert-butyl-4-hydroxyhydrocinnamic acid triester of 1,3,5-tris-(2-hydroxyethyl)-a-triazine-2,4,6-(1H.3H.5H) trione with a molecular weight of 1042 commercially available under the trademark "Vanox SKT." Other antioxidants that have been used include, for example, tris(di-t-butyl-p-hydroxybenzyl)trimethylbenzene (Ionox 330), alkylated bisphenol (Naugawhite), zinc dibutyl dithiocarbamate (Butyl Zimate), and 4,4'-methylene bis(2,6-di-tert-butylphenol) (Ethyl 702), tetrakis[methylene(3,5-di-tert-butyl-4-hydroxyhydrocinnamate) methane] (Irganox 1010), lauryl stearyl thiodipropionate (Plastanox 1212), and dilauryl 3,3'-thiodipropionate (Plastanox LTDP), 2,6-di-tert-butyl-p-cresol (BHT) and the like.

However, such antioxidants do not provide sufficient protection against oxidative degradation to a poly(vinylmethylether) hot-melt formulation at high temperatures over an extended period of time as measured by the carbonyl index of aged samples as determined by infrared spectra.

Now it has been found that an improved poly(vinylmethylether) hot-melt formulation with improved protection against oxidative degradation at high temperatures over an extended period of time as measured by the carbonyl index of poly(vinylmethylether) formulations can be obtained by incorporating a stabilizer, polymerized 1,2-dihydro-2,2,4-trimethylquinoline into a poly(vinylmethylether) before the poly(vinylmethylether) has a hydroperoxide content greater than about 1000 parts per million (ppm), preferably less than about 500 ppm, more preferably less than about 300 ppm. An initial presence of greater than 1000 ppm of hydroperoxides reduces the oxidative stabilization of the poly(vinylmethylether) to an unacceptable level when the poly(vinylmethylether) is exposed to an elevated temperature for a prolonged period.

It is therefore an object of this invention to provide a new and useful adhesion promoter composition comprising PVME and an antioxidant; the composition initially containing up to about 1000 ppm of hydroperoxides measured at room temperature, and wherein the carbonyl index of the adhesive composition after exposure to 350° F. for a period of up to about 104 hours is no more than about 2.9.

It is still a further object of this invention to provide a composition of PVME with excellent characteristics as to color and heat stability, with improved resistance to discoloration, skinning and charring.

It is still further an object of this invention to provide a new and useful adhesion promoter composition comprising PVME characterized by outstanding oxidatively stabilized properties. The oxidatively stabilized composition comprising PVME is employed in hot-melt formulations to obtain improved characteristics as to the lessened development of discoloration, skinning, charring, or change in viscosity upon prolonged application of heat.

SUMMARY

This invention relates to an oxidatively stabilized adhesion promoter composition for hot-melt adhesives useful for binding such materials as Kraft paper, burlap, glass, metals and polyolefins to provide improved heat and color stability, which oxidatively stabilized adhesion promoter comprises a poly(vinylmethylether) and a stabilizing antioxidant consisting of polymerized 1,2-dihydro-2,2,4-trimethylquinoline having a number average molecular weight of from about 350 to about 750. The stabilizing antioxidant can also comprise the said polymerized 1,2-dihydro-2,2,4-trimethylquinoline and a secondary antioxidant selected from the group consisting of organic compounds of sulfur and trivalent phosphorus. The poly(vinylmethylether) has a number average molecular weight of from about 5,000 to about 100,000. The antioxidant is present in the stabilized poly(vinylmethylether) in an amount from about 0.01 weight percent to about 2.0 weight percent. The improved adhesion promoter composition can contain an initial level of hydroperoxides up to about 1000 ppm measured at room temperature, of about 25° C., and has a carbonyl index of less than about 2.9 after exposure to a high temperature for a prolonged period.

DETAILED DESCRIPTION OF THE INVENTION

This invention discloses an oxidatively stabilized adhesion promoter for hot-melt adhesives which, upon exposure to hot-melt application temperatures for prolonged periods, has improved characteristics as to lessened development of discoloration, skinning, charring and changes in viscosity. Specifically, polymerized 1,2- dihydro-2,2,4-trimethylquinoline, Naugard Super Q (Uniroyal Chemical Company Inc.), oxidatively stabilizes PVME against thermal oxidative degradation. The stabilized PVME composition can contain hydroperoxides up to about 1000 ppm at room temperature before exposure to an elevated temperature and a carbonyl index of 2.9 after exposure to elevated temperatures for prolonged periods.

It has been found that the level of hydroperoxides present in the poly(vinylmethylether) affects the development of discolorization, skinning, charring or change in viscosity of poly(vinylmethyl ether) upon the prolonged application of heat to about 350° F. It has been found that an initial level of hydroperoxides of less than about 1000 parts per million, preferably less than 500 ppm, more preferably less than 300 ppm, in the presence of from about 0.01 weight percent to about 2.0 weight percent of polymerized, 1,2-dihydro-2,2,4-trimethylquinoline improves the oxidative stability of poly(vinylmethylether, as measured by the carbonyl index of the polymer, to a level such that the polymer is stabilized against oxidative degradation and gel and skin formation at temperatures of from 25° C. to about 350° F. for extended periods. Tests of stabilized polymers have indicated periods of as long as 104 hours at 350° F. without significant degradation of the polymer can be obtained.

The stabilized poly(vinylmethylethers) for hot-melt adhesives are prepared by incorporating the antioxidant into the polymer wherein the polymer has a hydroperoxide level of less than about 1000 ppm, preferably less than about 500 ppm, more preferably less than about 300 ppm. The presence of hydroperoxide levels greater than about 1000 ppm substantially impairs the antioxidant activity of the polymerized 1,2-dihydro-2,2,4-trimethylquinoline. Upon exposure to elevated temperatures for periods as short as 56 hours, a polymer having a hydroperoxide level greater than 1000 ppm and containing the antioxidant exhibits unacceptable degrees of degradation as measured by its carbonyl index.

It is preferable to incorporate the antioxidant into the polymer when the polymer is first formed, or as soon thereafter as is convenient, to prevent the formation of hydroperoxides. The incorporation of other antioxidants into the polymer to prevent the initial formation of hydroperoxides can be performed but incorporation of the polymerized 1,2-dihydro-2,2,4-trimethylquinoline before exposure of the polymer to elevated temperature is necessary to prepare the improved adhesion promoter composition which contains an initial level of hydroperoxides of less than about 1000 ppm measured at room temperature and a carbonyl index of less than about 2.9 after exposure to a high temperature for a prolonged period.

The stabilized poly(vinylmethylether) can be prepared by dissolving the polymer and the antioxidant in polar organic solvents. The typical organic solvents are acetone, toluene, chloroform, methyl ethyl ketone, and ethers. The amounts of antioxidant used in the polymer are between 0.01-2.0 wt. %. The preferred amounts are 0.2-1.0 wt. %. The organic solvent is removed by a rotary evaporator or similar technique and the polymer is dried in a vacuum.

To test the effectiveness of various stabilizers, the stabilized polymer was aged in an oven at 350° F. for various time intervals. The aged samples were dissolved in chloroform and cast on sodium chloride (NaCl) plates. Infrared spectra were recorded to monitor the development of the oxidized products. Up to 104 hr aging, the sample containing up to about 500 ppm of hydroperoxides stabilized with polymerized 1,2-dihydro-2,2,4-trimethylquinoline was still tacky and only trace amounts of the oxidized products were detected.

The stabilizer, polymerized 1,2-dihydro-2,2,4-trimethylquinoline, is preferred and advantageously incorporated in the polymer when first formed, to protect the polymer before formation of hydroperoxides. This can be accomplished by adding the stabilizer to the polymer in the reaction vessel after quenching the catalyst but before washing the polymer to reduce the concentration of catalyst residue. Polymerized 1,2-dihydro-2,2,4-trimethylquinoline can also be used in combination with a secondary antioxidant such as a thioester and/or a phosphite to give effective performance.

Secondary antioxidants comprising organic compounds of sulfur and trivalent phosphorus can be used in conjunction with the stabilizing antioxidant, polymerized 1,2-dihydro-2,2,4-trimethylquinoline, to provide improved oxidative stability to the poly(vinylalkylethers). Representative secondary antioxidants, but not limited to these, are sulfides, phosphites, phosphonates metal salts of dialkyldlithiocarbamates and metal salts of dithiophosphates. Some examples of these compounds are thioesters, typically diproprionic acid derivatives such as distearyl thiodiproprionate (DSTDP) and tetrakis [methylene 3-(dodecylthio) proprionate] methane. Other examples are dioctadecyldisulfide, zinc diisopropyldithiophosphate, zinc dibutyl dithiocarbamate, tris (2,4,-di-tert butylphenyl) phosphite, tris (monononylphenyl) phosphite, bis (2,4-di-tert butylphenyl) pentaerythritol diphosphite and mixtures thereof. A secondary antioxidant can be present in oxidatively stabilized adhesion promoter in an amount of from about 10 wt. % to about 75 wt. % of the weight of the polymerized 1,2-dihydro-2,2,4-trimethylquinoline. Concentration of the stabilizing antioxidant to the secondary antioxidant is preferably at least 50:50. More preferably, the concentration of the stabilizing antioxidant is greater than the concentration of the secondary antioxidant. A preferable ratio by weight of polymerized 1,2-dihydro-2,2,4-trimethylquinoline to a secondary antioxidant accordingly is at least 50:50. A more preferable ratio by weight of polymerized 1,2-dihydro-2,2,4-trimethylquinoline to a secondary antioxidant is at least 51:49 or more.

Heat-stabilized poly(vinylmethylether) compositions for hot-melt adhesive applications can contain a number of suitable components which, individually, in conjunction with other components, produce an effective adhesive. For example, hot-melt adhesives can contain, in addition to the poly(vinylmethylether), a thermoplastic resin selected from the group consisting of $C_2$ to $C_6$ polyolefins and copolymers thereof such as a polystyrene block copolymer, an ethylene vinyl acetate copolymer and a petroleum resin, along with other materials, such as tackifier resin selected from the group consisting of terpene resins, terepene-phenol resins, coumarone-indene resins, aliphatic and aromatic petroleum resins, hydrogenated petroleum resins, resins made by copolymerization of aromatic monomers, a wood rosin and wood rosin esters. Suitable base resins and other components are taught in the prior art, U.S. Pat. Nos. 2,970,974 and 5,080,978, which are incorporated by reference A test of a formulated adhesive composition containing many components can yield results difficult to interpret as to the efficacy of individual components as to their ability to perform a desired function. Formulation of a single component with a single modifying agent in conjunction with a suitable test procedure is preferable.

Since hydroperoxides can be generated by the mechanism of auto-oxidation, measurement of the presence of hydroperoxides has been used to determine the level of oxidative stability imparted to poly(vinylmethylether) by incorporation of antioxidants without masking of the results by the presence of other adhesive formulation components. A quantitative measurement of the presence of hydroperoxides is determined by treatment with sodium iodide, followed by measurement of the intensity of visible absorption of the iodine color. The presence of hydroperoxides gives rise to hydroxyl and carbonyl groups. The rate of oxidative degradation of poly(vinylmethylether) is determined by infrared spectroscopy of the development of hydroxyl and carbonyl groups which have distinguishable absorbances in the infrared region. The growth of the hydroxyl group does not increase as the aging time increases. Therefore, only the carbonyl groups are monitored.

The carbonyl index is defined as follows:

$$\text{Carbonyl Index} = \frac{\text{Absorbance of C=O at 1750 }^{cm-1}}{\text{Absorbance of C-H 3450 }^{cm-1}} \times 100$$

wherein the numerator represents the absorbance of the carbonyl group at 1750 $^{cm-1}$, and the denominator represents the peak absorbance of a carbon-hydrogen bond at 3450 $^{cm-1}$.

In summary, this invention relates to an oxidatively stabilized adhesion promoter composition for hot-melt adhesive compositions with improved heat and color stability, which are useful for binding such materials as Kraft paper, burlap, glass, metals and polyolefins, which adhesion promoter composition comprises poly(vinylmethylether), said poly(vinylmethylether) having a number average molecular weight of from about 5,000 to about 100,000 and a stabilizing antioxidant consisting of polymerized 1,2-dihydro-2,2,4-trimethylquinoline having a number average molecular weight of from about 350 to about 750. The stabilizing antioxidant can also comprise the said polymerized 1,2-dihydro-2,2,4-trimethylquinoline and a secondary antioxidant selected from the group consisting of a sulfide, phosphite, phosphonate, salts of dialkyldithiocarbamates and dithiophosphates wherein the ratio of polymerized 1,2-dihydro-2,2,4-trimethylquinoline to the secondary antioxidant is in the range of from 90:10 to 25:75 weight percent. The antioxidant is present in the stabilized poly(vinylmethylether) in an amount from about 0.01 weight percent to about 2.0 weight percent. The improved adhesion promoter composition contains up to about 1000 ppm, preferably up to about 500 ppm, of hydroperoxides measured at room temperature and has a carbonyl index of less than about 2.9 after exposure to a high temperature for a prolonged period. The hot-melt composition containing the oxidatively stabilized adhesion promoter of this invention can contain a thermoplastic resin selected from the group consisting of $C_2$ to $C_6$ polyolefins and copolymers thereof, polystyrene block copolymers, ethylene vinyl acetate copolymers, and petroleum resins, and a tackifier resin selected from the group consisting of terpene resins, terepene-phenol resins, coumarone-indene resins, aliphatic and aromatic petroleum resins, hydrogenated petroleum resins, resins made by copolymerization of aromatic monomers, a wood rosin, and wood rosin esters. The hot-melt adhesive composition containing the oxidatively stabilized adhesion promoter has utility in a bonded structure comprising the said hot-melt adhesive composition and a substrate selected from the group consisting of Kraft paper, burlap, glass, metals, a high density polyethylene, low density polyethylene, polypropylene, ethylene-propylene copolymers, polymethylpentene, latex-backed carpet, polyethylene-backed carpet, high impact polystyrene, polyethylene terephthalate, poly(2,6-methylphenylene oxide) and blends thereof with polystyrene, and a copolymer of acrylonitrile, butadiene and styrene.

The following examples are exemplary only and are not to be construed as limiting the scope of the invention.

EXAMPLE I

The following example illustrates the procedure for determining the concentration of hydroperoxide in parts per million (ppm) in the polymer.

Hydroperoxides formed in PVME were treated with excess sodium iodide in a quantitative analysis. The concentration of hydroperoxides was determined by the intensity of visible absorption of the iodine color.

A known amount of the PVME sample weighing 0.01–0.5 g and 1.0 ml of sodium iodide solution (1 g/10 ml of acetic anhydride) were added to a 10 ml volumetric flask and the total volume was brought to 10 ml with acetone. The solution was purged with nitrogen for 15 minutes. The absorbance of the solution was measured in a 1 cm tube at 430 nm using a Spectronic 21 spectrometer (Milton Roy Company). A blank reading was obtained by measuring the absorbance of the sodium iodide solution (1.0 ml of standard solution diluted to 10 ml) in a 1.0 cm tube. A calibration curve was established by plotting the measured absorbance at 430 nm of each standard solution vs. concentration of hydrogen peroxide. The standard solutions were prepared by diluting 0.2, 0.4, 0.6, 0.8, 1.0 ml of the working solution to 10 ml with distilled water. The working solution was prepared by dissolving 3.3 ml of 30% hydrogen peroxide in 1 liter of distilled water, and then diluting 10 ml of this solution to 100 ml with distilled water. The standard solutions correspond to 2,4,6,8, and 10 ppm hydrogen peroxide. The concentration of hydrogen peroxide in the solution was obtained from the calibration curve using the absorbance of the solution subtracted from that of the blank. The concentration of hydroperoxide (ppm) in polymer was calculated by the following equation:

$$\text{ppm hydroperoxide in polymer} = \frac{(\text{ppm hydrogen peroxide from curve} \times 10 \text{ mL})}{\text{sample weight (g)}}$$

The solution was diluted to an appropriate level with acetone before adding 1.0 ml of sodium iodide, when the concentration of hydroperoxide was too high.

EXAMPLE II

The following example illustrates the method for determining the color, inherent viscosity and carbonyl index of a polymer sample as a measure of the oxidative degradation of the stabilized poly(vinylmethylether).

The stabilized sample was prepared by dissolving PVME and 1% of an antioxidant or 1% of a combination of two antioxidants in a ratio of 50:50 in acetone. The solvent was removed by a rotary evaporator and then the sample was dried in vacuo. The sample of PVME (2.80 g) with or without antioxidant was placed in an aluminum dish lined with a Teflon ™ coated fabric and melted to form a plaque with a thickness of 200 mil. The sample was then aged in an oven at 350° F. for various time intervals. The color of the aged sample in a plaque was measured by comparison with Gardner color. The inherent viscosity was measured in chloroform at 25° C. using an Ubbelohde viscometer, and calculated by the following equation:

$$\eta_{inh}(dl/g) = ln(t_2/t)/c$$

t = flow time of a solvent, chloroform
$t_2$ = flow time of the solution
c = concentration of the solution, g/100 ml The oxidatively degraded products contain hydroxyl and carbonyl groups which have distinguishable absorbances in the infrared region. The rate of oxidative degradation of PVME was monitored by infrared spectroscopy on the basis of development of hydroxyl and carbonyl groups. The sample was prepared by dissolving the aged PVME in chloroform and then cast on NaCl plate. After the solvent was vaporized, the IR spectrum was recorded on a Perkin-Elmer 1420 Infrared Spectrophotometer. The growth of hydroxyl group does not increase as the aging time increases. Therefore, only carbonyl groups are monitored. The content of oxidized products is related to the carbonyl index. The carbonyl index is defined by the ratio of the absorbance of the carbonyl group at 1750 $cm^{-1}$ to the absorbance of the carbon-hydrogen group at 3450 $cm^{-1}$ as follows:

$$\text{Carbonyl Index} = \frac{\text{Absorbance of C=O at 1750 } cm^{-1}}{\text{Absorbance of C—H 3450 } cm^{-1}} \times 100$$

The antioxidants tested are listed in Table I.

TABLE I

| Trade Name | Chemical Name |
|---|---|
| BHT | Butylated hydroxytoluene |
| Irganox 1010 | Tetrakis [methylene(3,5-di-tert-butyl-4-hydroxy-hydrocinnamate)]methane |
| Irgafos 168 | Tris(2,4-di-tert-butyl-phenyl)phosphite |
| Irganox B-225 | Irganox 1010 + Irgafos 168 |
| Irganox 3114 | 1,3,5-Tris(3,5-di-t-butyl-4-hydroxybenzyl)-s-triazine-2,4,6(1H, 3H, 5H)trione |
| Irganox 565 | 2,4-Bis(n-octylthio)-6-(4-hydroxy-3,5-di-tert-butylanilino)-1,3,5-triazine |
| DSTDP | Distearyl thiodipropionate |
| Naugard P | Tris(mono-nonylphenyl)phosphite |
| Naugard Super Q | Polymerized 1,2-dihydro-2,2,4-trimethylquinoline |
| Weston 619 | Distearyl pentaerythritol phosphite |
| Ultranox 626 | Bis(2,4-di-tert-butylphenyl)pentaerythritol diphosphite |
| Tinuvin 765 | Bis(1,2,2,6,6-pentamethyl-4-piperidinyl) sebacate |
| Vanox 12 | 4,4'-Dioctyldiphenylamine |
| Naugard 445 | 4,4'-Bis(α,α-dimethylbenzyl)diphenylamine |

EXAMPLE III

The following example illustrates that the oxidative deterioration of PVME results in viscosity changes. The mechanisms of deterioration of polymers can be either by cross-linking or chain-breaking. A change of viscosity causes problems with processility, and physical, chemical and mechanical properties loss. It is necessary to add an antioxidant to a polymer to reduce viscosity change but deterioration can still occur despite the addition of an antioxidant. The efficiency of an antioxidant in preventing oxidative deterioration can vary as indicated in Table II.

Viscosities of the aged PVME samples were measured in chloroform at 25° C. by an Ubbelohde viscometer. The results are summarized in Table II. After prolonged aging, an insoluble gel formed which increased viscosity. Since the gel is not soluble in any organic solvents, the measured viscosity is not the real viscosity of the aged PVME. Therefore, viscosity changes were only monitored before gel formation. The mode of oxidative degradation can depend on the aging time. The predominate mode of degradation is chain-scission for short aging periods. However, it changed to cross-linking and gel formation after prolonged aging periods.

The stabilized PVME retained its viscosity longer than the unstabilized PVME. A combination of Irganox 1010 with Irgafos 168 was more effective than Irganox 1010 alone. However, a combination of BHT with Ultranox 626 or Irgafos 168 was as effective as BHT alone. Original inherent viscosity is shown as 100%. Decrease in inherent viscosity is indicated by the decreasing percentages.

TABLE II

| | Inherent Viscosities of Aged PVME Samples | | | |
|---|---|---|---|---|
| Antioxidant | 0 hr | 2 hr | 6.5 hr | 16 hr |
| None | 0.5010 | 0.4491 | 0.4512 | 0.4352 |
| | (100%) | (89.6%) | (90.1%) | (86.9%) |
| Irganox 1010 | 0.5045 | 0.4743 | 0.4749 | 0.4523 |
| | (100%) | (94.0%) | (94.1%) | (89.7%) |
| Irganox B-225 | 0.4888 | 0.4940 | 0.4924 | 0.4393 |
| | (100%) | (101.1%) | (100.7%) | (89.7%) |
| Irganox 1010 + Ultranox 626 | 0.4962 | 0.5222 | 0.5041 | 0.4838 |
| | (100%) | (105.2%) | (101.6%) | (97.5%) |
| BHT | 0.5093 | 0.5278 | 0.4782 | 0.4800 |
| | (100%) | (103.6%) | (93.9%) | (94.2%) |
| BHT + Ultranox 626 | 0.4909 | 0.4736 | 0.4651 | 0.4637 |
| | (100%) | (96.5%) | (94.7%) | (94.5%) |
| BHT + Irgafos 168 | 0.5004 | 0.4805 | 0.4697 | 0.4535 |
| | (100%) | (96.0%) | (93.9%) | (90.6%) |

Note:
The inherent viscosity was measured in chloroform at 25° C. using an Ubbelohde viscometer

EXAMPLE IV

Hydroperoxide levels were determined in stabilized and unstabilized PVME according to the procedure described above in Example I. The samples had been aged at room temperature for the periods indicated. Commercially available PVME, Lutonal ™, available from BASF and Gantrez ™, available from GAF, were tested with PVME from Amoco Chemical Company. The hydroperoxide level indicated that an antioxidant was present in the BASF Lutonal ™ but that none may have been present in the GAF Gantrez ™. The amount of antioxidant in the BASF Lutonal ™ was not determined. Results are in Table III.

TABLE III

| Hydroperoxide Level in Stabilized and Unstabilized PVME | | | |
|---|---|---|---|
| PVME | Shelf Life | Antioxidant | Hydroperoxide (ppm) |
| Amoco 12957-50 | 11 Mo. | None | 12,800 (T)[1] |
| Amoco 12957-50 | 11 Mo. | None | 4,850 ± 1290 (B)[1] |
| Amoco | 11 Mo. | None | 1,146 ± 9 |

TABLE III-continued

| Hydroperoxide Level in Stabilized and Unstabilized PVME | | | |
|---|---|---|---|
| PVME | Shelf Life | Antioxidant | Hydroperoxide (ppm) |
| 12957-54 Amoco | 10 Mo. | None | 13,800 ± 110 |
| 12957-62 Amoco | 8 Mo. | 1% BHT | 41 ± 10 |
| 12957-71 Amoco | 8 Mo. | BHT (0.5%) Irgafos 168 (0.5%) | 3 ± 1 |
| 12957-79 Amoco | 6 Mo. | Iranox B-225 (Irganox 1010 (0.5%) Irgafos 168 (0.5%) | 3 ± 1 |
| 14095-50 | | | |
| BASF Lutonal ™ M-40[2] | >12 Mo. | N.D. | 270 ± 30 |
| BASF Lutonal ™ M-40[3] | >12 Mo. | N.D. | 243 ± 7 |
| GAF Gantrez ™ M-556 | >12 Mo. | N.D. | 9,980 ± 480 (T)[1] |
| GAF Gantrez ™ M-556 | >12 Mo. | N.D. | 5,080 (B)[1] |

Note:
[1]T: top layer, B: bottom layer
[2]40% aqueous solution
[3]100% solid
N.D. - Not determined The data in Table III indicate that the concentration of hydroperoxides in PVME can depend on the age of PVME, the type and concentration of antioxidant added, when the antioxidant was added, and which part of the sample was analyzed. PVME is very viscous. The top layer forms hydroperoxides much more rapidly than does the bottom layer, because of the slow diffusion rate of oxygen through PVME. In the absence of antioxidant, PVME can contain hydroperoxides in levels of 1,146 to 13,800 ppm. On the other hand, the levels can drop to less than 50 ppm when the samples are stabilized by the addition of 1% antioxidant(s). The level of hydroperoxides in PVME also can depend on the type of antioxidant added. For example, the sample containing 1% of butylated hydroxytoluene (BHT) has a level of hydroperoxide of 41 ppm, compared to 3 ppm for the sample containing a combination of Irgafos 168 (0.5%) with either BHT or Irganox 1010 (0.5%).

The sample of Lutonal ™ M-40 (PVME manufactures by BASF) contained hydroperoxides at 270 and 241 ppm in water solution and in neat solid, respectively. The results indicated that Lutonal ™ contains an antioxidant. Gantrez ™ (PVME manufactured by GAF) has a higher level of hydroperoxide than Lutonal ™ and may not contain an antioxidant.

EXAMPLE V

To test the effectiveness of polymerized 1,2-dihydro-2,2,4-trimethylquinoline at controlling discoloration, the color of aged samples containing 1% antioxidant was measured and compared. Samples of PVME (Amoco PVME-hydroperoxide level of up to about 500 ppm) containing 1% various antioxidants were prepared by dissolving the polymer and the antioxidant in acetone, followed by a removal of solvent by evaporation, and drying in vacuo. A sample of the stabilized PVME (2.8 g) was placed in an aluminum dish lined with a Teflon ™-coated fabric and melted to form a plaque with a thickness of 200 mil. Each sample was then aged in an oven at 350° F. at various time intervals and the color recorded according to the Gardner color number. The results in Table IV show that polymerized 1,2-dihydro-2,2,4-trimethylquinoline demonstrated superior performance at controlling discoloration although this antioxidant is yellowish tan in color. 4,4'-bis(α,α-dimethylbenzyl)diphenylamine (Naugard 445) gave good protection against discoloration but did not give consistent performance.

Six stabilized PVME samples in Table IV contained a secondary antioxidant and polymerized 1,2-dihydro-2,2,4-trimethylquinoline, Naugard Super Q, in a weight ratio of 50:50. The secondary antioxidant, in each example was a phosphite, i.e., Irgafos 168, Naugard P, Ultranox 626, Weston 619, and DSTDP. The Gardner colors after aging for extended periods up to 104 hours at 350° F. indicated that secondary antioxidants can be used in conjunction with polymerized 1,2-dihydro-2,2,4-trimethylquinoline to control oxidative stability of PVME.

TABLE IV

| Gardner Color of PVME[1] With Antioxidants After Aging | | | | | | | | |
|---|---|---|---|---|---|---|---|---|
| Antioxidant | 0 hr | 8 hr | 16 hr | 24 hr | 40 hr | 56 hr | 80 hr | 104 hr |
| None | 2 | 13 | 16 | >18 | | | | |
| Irganox 1010 (1%) | 1 | 8 | 13 | 17 | >18 | | | |
| Irganox B-225 (1%) | 1 | 2 | 5 | 12 | 16 | | | |
| Irganox 1010 (.5%) + DSTDP (.5%) | 1 | 2 | 13 | 15 | 17 | >18 | | |
| Irganox 1010 (.5%) + Naugard P (.5%) | 1 | 12 | 15 | 17 | | | | |
| Naugard Super Q (.5%) + Irgafos 168 (.5%) | 3 | 3 | 7 | 7 | 10 | 11 | | |
| Irganox 3114 (1%) | 2 | 9 | 15 | 15 | >18 | | | |
| 1,3-Propandiol (1%) | 1 | 15 | >18 | | | | | |
| Naugard Super Q (.5%) + Irgafos 168 (.5%) | 3 | 5 | 6 | 7 | 9 | 10 | 10 | 11 |
| Naugard Super Q (.5%) + Naugard P (.5%) | 3 | 5 | 6 | 7 | 9 | 10 | 10 | 11 |
| Naugard Super Q (.5%) + Ultranox 626 (.5%) | 3 | 5 | 6 | 7 | 9 | 10 | 10 | 11 |
| Naugard Super Q (.5%) + Weston 619 (.5%) | 2 | 4 | 5 | 6 | 9 | 10 | 10 | 11 |
| Naugard Super Q (1%) | 2 | 3 | 4 | 6 | 7 | 7 | 11 | 11 |
| Naugard 445 (1%)[2] | 1 | 3 | 4 | 5 | 5 | 5 | 7 | 8 |
| Naugard Super Q (.5%) + DSTDP (.5%) | 2 | 3 | 4 | 6 | 7 | 7 | 8 | 9 |

[1]PVME used in test was Amoco PVME with a hydroperoxide level of up to about 500 ppm.
[2]The result shown here is the best performance among five Naugard 445 samples tested.

EXAMPLE IV

To test the effectiveness of polymerized 1,2-dihydro-2,2,4-trimethylquinoline at controlling thermal oxidative degradation as measured by carbonyl index, samples of PVME (Amoco PVME-hydroperoxide level of up to about 500 ppm) containing antioxidants were prepared as described above and aged at 350° F. at various time intervals. Infrared spectra of the aged samples were recorded to monitor the development of the oxidized products.

The effect of exposure to elevated temperatures for prolonged periods upon PVME containing antioxidants, as measured by the carbonyl index of individual samples, is illustrated in Tables V and VI. All samples contained 1% by weight antioxidant. Aging temperature was 350° F.

TABLE V

Oxidative Stability of PVME with Antioxidants at 350° F.

| Antioxidant | Carbonyl Index of Aged Samples | | | | | | | |
|---|---|---|---|---|---|---|---|---|
| | 0 hr | 8 hr | 16 hr | 24 hr | 40 hr | 56 hr | 80 hr | 104 hr |
| None | ND[1] | 13.1 | 25.4 | 11.1 | | | | |
| Irganox 1010 | 3.8 | 6.3 | 16.3 | 55.7 | 61.6 | 74.3 | | |
| Irganox B-225 | ND | 2.5 | 4.7 | 17.7 | 25.2 | 23.0 | | |
| Irganox 1010 + DSTDP | 2.6 | 5.2 | 7.1 | 21.1 | 18.4 | 67.9 | | |
| Irganox 565 | ND | 2.5 | 8.6 | 7.6 | 34.2 | | | |
| Irganox 1010 + Naugard P | 2.5 | 14.7 | 17.9 | 23.9 | | | | |
| Irganox 1010 + Irganox 565 | 2.0 | 2.5 | 8.0 | 6.7 | 30.0 | | | |
| Irganox 3114 | 4.8 | 12.9 | 18.2 | 29.3 | 26.0 | 46.6 | | |
| Naugard 445[2] | 1.9 | trace | 2.0 | 1.8 | 2.7 | 3.7 | 4.4 | 4.9 |
| 1,3-Propanediol | ND | 19.7 | 12.9 | 16.2 | 22.2 | 8.5 | | |
| Naugard Super Q | ND | ND | ND | ND | trace | trace | 2.4 | 2.9 |

[1]ND = Not Detected
[2]The result shown here is the best performance among the five Naugard 445 samples tested.
Note:
The total concentration of antioxidants is 1%. For the binary antioxidant packages, the ratio among antioxidants is 1:1. PVME used in test was Amoco PVME with a hydroxide level of up to about 500 ppm.

The results in Table V show that polymerized 1,2-dihydro-2,2,4-trimethylquinoline provides superior protection against thermal oxidative degradation, compared to other antioxidants. The stabilized PVME contains up to about 500 ppm of hydroperoxides and the carbonyl index is less than about 2.9 after 104 hours.

Irganox 1010, a cinnamic acid derivative, widely used a an antioxidant, did not provide sufficient protection against oxidative degradation of PVME as measured by the carbonyl index.

Data in Table V also indicate that phosphite secondary antioxidants in the absence of polymerized 1,2-dihydro-2,24-trimethyloquinoline are ineffective in oxidatively stabilizing PVME exposed to an elevated temperature for an extended period.

TABLE VI

Oxidative Stability of Aged PVME to Antioxidants

| Antioxidant | Carbonyl Index of Aged Samples | | | | | | | |
|---|---|---|---|---|---|---|---|---|
| | 0 hr | 8 hr | 16 hr | 24 hr | 40 hr | 56 hr | 80 hr | 104 hr |
| Naugard 10[1] + Naugard Super Q | 2.5 | ND[2] | 3.6 | ND | 8.0 | 2.4 | 32.5 | No |
| Naugard Super Q + Irgafos 168 | ND | ND | ND | ND | ND | ND | trace | trace P |
| Naugard Super Q + DSTDP | 2.5 | 1.8 | 1.3 | 1.3 | 2.6 | 1.8 | 2.8 | 2.8 P |
| Naugard Super Q + Naugard P | ND | ND | ND | ND | ND | ND | trace | 2.1 P |
| Naugard Super Q + Ultranox 626 | ND | ND | ND | ND | ND | ND | ND | 4.7 P |
| Naugard Super Q + Weston 619 | ND | ND | ND | ND | ND | ND | trace | 1.4 P |

[1]The chemical structure of Naugard 10 is same as that of Irganox 1010
[2]ND = Not Detected
Note:
The total concentration of antioxidants is 1% and the ratio of Naugard Super Q/phosphite or Naugard Super Q/thioester is 1/1. PVME used was Amoco PVME with a hydroxide level of up to about 500 ppm.

The results in Table VI show that polymerized 1,2-dihydro-2,2,4-trimethylquinoline, in conjunction with phosphite secondary antioxidants can provide superior protection against thermal oxidative degradation, as compared with the performance of other antioxidants used separately.

Naugard 10, a cinnamic acid derivative, of the same chemical structure as Irganox 1010, and which is not an organic compound containing sulfur or trivalent phosphorus, did not provide sufficient protection against oxidative degradation of PVME as measured by the carbonyl index.

EXAMPLE V

Samples of commercially available PVME of a bright orange color and pungent odor and samples of Amoco PVME, colorless to pale yellow, were treated with a reducing agent, borane-tetrahydrofuran, ($BH_3$-THF) to reduce color and odor. The treated and untreated samples were aged at 350° F. for periods of five, ten and fifteen hours. The thermal stability of the treated samples was compared with the untreated samples. Results are in Table VII.

TABLE VII

Color and Carbonyl Index of PVME at 350° F. for 5, 10 and 15 hours

| PVME | Hyproperoxide (ppm) | Init. color | 5 hr color | 5 hr C—O[2] | 10 hr color | 10 hr C—O | 15 hr color | 15 hr C—O |
|---|---|---|---|---|---|---|---|---|
| GAF | 9980 ± 480 | 8 | 13 | 11.3[3] | 14 | 15.6[3] | 16 | 14.8[3] |
| GAF[1] | | 1 | 16 | 5.6 | 16 | 10.7[3] | >18 | 12.1[3] |
| BASF | 270 ± 30 | 9 | 14 | 12.4[3] | 15 | 35.2[3] | 16 | 31.1[3] |
| BASF[1] | | 1 | 6 | 7.1 | 14 | 9.4 | 16 | 10.4[3] |
| Amoco | 250 ± 25 | 3 | 1 | ND[4] | 5 | 3.6 | 12 | 13.5 |
| Amoco[1] | | 1 | 2 | ND[4] | 8 | 5.0 | 14 | 10.1 |

[1]$BH_3$—THF treated, Hydroperoxide level not determined after treatment
[2]C—O index: (infrared absorbance of C—O/infrared absorbance of C—H) × 100
[3]Gel formation observed
[4]ND: not detected The rate of formation of oxidized products in aged PVME is shown in Table VII. The results indicate that treatment with a reducing agent to reduce color and odor, in absence of an antioxidant, is ineffective in preventing color degradation upon exposure to elevated temperatures.

The effect on the thermal stability of treated PVME with an addition of an antioxidant Irganox 1010 is shown in Table VIII. Irganox 1010 was used as representative of commercial antioxidants readily available to practitioners in the art.

TABLE VIII

Effect of Commercial Antioxidant on Discoloration and Carbonyl Index of Aged PVME at 350° F.

| PVME | Hyproperoxide (ppm) | Init. color | 5 hr color | 5 hr C—O[2] | 10 hr color | 10 hr C—O | 15 hr color | 15 hr C—O |
|---|---|---|---|---|---|---|---|---|
| GAF | 9980 ± 480 | 8 | 13 | 14.2[3] | 15 | 18.4[3] | 17 | 16.4[3] |
| GAF[1] | | 1 | 15 | 2.3 | 16 | 7.8[3] | 18 | 15.7[3] |
| BASF | 270 ± 30 | 9 | 11 | 7.1[3] | 15 | 22.7[3] | 17 | 26.8[3] |
| BASF[1] | | 1 | 6 | ND[4] | 8 | 2.2 | 12 | 6.0 |
| Amoco | 250 ± 25 | 3 | 1 | 2.6 | 3 | 3.3 | 5 | 4.9 |
| Amoco[1] | | 1 | 2 | trace | 9 | 2.6 | 12 | 8.0 |

[1]Treated with $BH_3$—THF, Hydroperoxide level not determined after treatment
[2]C—O index: (infrared absorbance of C—O/infrared absorbance of C—H) × 100
[3]Gel formation observed
[4]ND: not detected
Antioxidant: Irganox 1010

The data in Table VIII indicate that the level of hydroperoxides present in PVME before treatment with an antioxidant can affect the color stability and carbonyl index of the PVME after the PVME has been treated with an antioxidant. The data indicate that PVME with an initial level of hydroperoxides of up to about 250, when treated with a commercial antioxidant other than polymerized 1,2-dihydro-2,2,4-trimethyl quinoline, degrades rapidly as measured by discoloration and carbonyl index upon exposure to a temperature of 350° F. for periods of five, ten and fifteen hours.

EXAMPLE VI

The effect on thermal stability of commercially available PVME with an addition of commercially available antioxidants is shown in Tables IX and X, as measured by the carbonyl index and Gardner color of individual samples. All samples contained 1% by weight antioxidant. Aging temperature was 350° F.

The data in Tables IX and X indicate that the oxidative stability of commercially available PVME can be improved by the presence of polymerized 1,2-dihydro-2,2,4-trimethylquinoline (Naugard Super Q) as measured by the carbonyl index and Gardner color during a prolonged exposure to an elevated temperature.

TABLE IX

Oxidative Stability of Commercially Available PVME to Antioxidants

| Antioxidant | PVME | 0 hr | 8 hr | 16 hr | 24 hr | 40 hr | 56 hr | 80 hr |
|---|---|---|---|---|---|---|---|---|
| None | BASF | 6.1 | 20.5 | 22.0 | 21.4 | 37.5 | | |
| | GAF | ND | 17.5 | 33.3 | | | | |
| 1% Naugard Super Q | BASF | 6.1 | 5.0 | 4.6 | 3.8 | 14.7 | 27.6 | |
| | GAF | ND | ND | ND | ND | ND | ND | 1.4 |
| 0.5% Naugard Super Q + 0.5% Irgafos 168 | BASF | 6.1 | 4.9 | 5.8 | 20.6 | 24.0 | 32.6 | |
| 1% Irganox | BASF | 6.1 | 18.3 | 29.5 | 32.5 | 31.8 | 34.6 | |

TABLE IX-continued

Oxidative Stability of Commercially Available PVME to Antioxidants

| Antioxidant | PVME | 0 hr | 8 hr | 16 hr | 24 hr | 40 hr | 56 hr | 80 hr |
|---|---|---|---|---|---|---|---|---|
| B-225 | GAF | ND | 2.3 | 2.3 | 7.0 | 32.2 | | |

Note:
Hydroperoxide levels of samples before treatment were:

BASF PVME 1710 ppm hydroperoxides
GAF PVME 102 ppm hydroperoxides
Carbonyl index of samples before treatment indicates some level of antioxidant may have been present originally.

Table IX illustrates that hydroperoxide levels of PVME polymers before addition of polymerized 1,2-dihydro-2,2,4-trimethylquinoline affects the oxidative stability of the PVME polymer on exposure of the polymer to an elevated temperature, 350° F., for periods of up to 80 hours, despite the addition of the polymerized 1,2-dihydro-2,2,4-trimethylquinoline.

The GAF PVME had an initial level of 102 ppm hydroperoxides before addition of the antioxidant. After 80 hours, the GAF PVME index was only 1.4. the BASF PVME had an initial level of 1710 ppm of hydroperoxides before addition of the antioxidant. The initial carbonyl index was an unacceptable 6.1. After 56 hours, the BASF PVME index was 27.6.

Table IX illustrates that the effect of high levels of hydroperoxides present in PVME before treatment with an antioxidant cannot be overcome by the addition of an antioxidant with subsequent exposure of the PVME polymer to an elevated temperature for a prolonged period. Table IX indicates that a low level of hydroperoxides is required before treatment with an antioxidant to stabilize the carbonyl index at a level less than about 2.9.

Commercially available polymerized 1,2-dihydro-2,2,4-trimethylquinolone (Naugard Super Q) and the other antioxidants contribute a measurable color to the untreated PVME, as shown in Table X and indicated by the colors of the untreated PVME versus the treated PVME at 0 hr exposure to an elevated temperature. However, as measured by the Gardner color of the samples after periods at an elevated temperature, the original color contribution of the antioxidants became of minor significance as compared with the improvement in the oxidative stability as measured by the carbonyl index and Gardner color of the treated samples.

TABLE X

Oxidative Stability of Commercially Available PVME to Antioxidants

| Antioxidant | PVME | Gardner Color | | | | | |
|---|---|---|---|---|---|---|---|
| | | 0 hr | 8 hr | 16 hr | 24 hr | 40 hr | 56 hr |
| None | BASF | 3 | 12 | 13 | 14 | 16 | 18 |
| | GAF | 1 | 11 | 14 | 15 | | |
| 1% Naugard Super Q | BASF | 11 | 15 | 16 | 17 | 17 | 18 |
| | GAF | 5 | 6 | 17 | 18 | | |
| 0.5% Naugard Super Q 0.5% Irgafox 168 | BASF | 10 | 12 | 13 | 13 | 16 | 18 |
| 1% Irganox B-225 | BASF | 6 | 11 | 12 | 14 | 16 | 18 |
| | GAF | 1 | 7 | 10 | 10 | 12 | |

Note:
Hydroperoxide levels of samples before treatment were:
BASF PVME - 1710 ppm hydroperoxides
GAF PVME - 102 ppm hydroperoxides
Gardner color of samples before treatment indicates some level of antioxidant may have been present originally.

That which is claimed is:

1. An oxidatively-stabilized adhesion promoter composition with color and heat stability, with resistance, as measured by said composition's carbonyl index, to discolorization, skinning, charring, and change in viscosity upon prolonged application of heat, for hot-melt adhesives, said composition comprising poly(vinylmethylether) of a number average molecular weight of from about 5000 to about 100,000, containing an initial level of hydroperoxides of up to about 1000 parts per million measured at about 25° C. and containing from about 0.01 weight percent to about 2.00 weight percent of polymerized 1,2-dihydro-2,2,4-trimethylquinoline as an oxidative stabilizer and antioxidant, said stabilized poly(vinylmethylether) composition having a carbonyl index of less than about 2.9 after exposure to temperatures up to 350° F. for periods up to 80 hours, as determined by the ratio of the infrared absorbance of carbonyl groups at 1750 cm$^{-1}$ to the infrared absorbance of carbon-hydrogen groups at 3450 cm$^{-1}$ measured by an infrared spectrophotometer.

2. A hot-melt adhesive composition which comprises the composition of claim 1, a thermoplastic resin selected from the group consisting of $C_2$ to $C_6$ polyolefins and copolymers thereof, polystyrene block copolymers, ethylene vinyl acetate copolymers, and petroleum resins, and a tackifier resin selected from the group consisting of terpene resins, terepenephenol resins, coumarone-indene resins, aliphatic and aromatic petroleum resins, hydrogenated petroleum resins, resins made by copolymerization of pure aromatic monomers, a wood rosin, and wood rosin esters.

3. A bonded structure comprising the adhesive composition of claim 2 and a solid substrate selected from the group consisting of Kraft paper, burlap, glass, metals, high density polyethylene, low density polyethylene, polypropylene, ethylene-propylene copolymers, polymethylpentene, latex-backed carpet, polyethylene-backed carpet, high impact polystyrene, polyethylene terephthalate, poly(2,6-methylphenylene oxide) and blends thereof with polystyrene, and a copolymer of acrylonitrile, butadiene and styrene.

4. A bonded structure comprising the adhesive of claim 2 and a polyethylene substrate.

5. A bonded structure comprising the adhesive composition of claim 2 and a polypropylene substrate.

6. A bonded structure comprising the adhesive composition of claim 2 and an ethylene-propylene copolymer substrate.

7. An oxidatively stabilized adhesion promoter composition for hot-melt adhesives comprising a stabilized poly(vinylmethylether) of a number average molecular weight of from about 5000 to about 100,000, containing an initial level of hydroperoxides of up to 1000 parts per million measured at about 25° C. and containing from about 0.01 weight percent to about 2.00 weight percent of an oxidative stabilizer and antioxidant selected from the group consisting of polymerized 1,2-dihydro-2,2,4-trimethylquinoline having a number average molecular weight of from about 350 to about 750, said polymerized 1,2-dihydro-2,2,4-trimethylquinoline and a secondary antioxidant selected from the group consisting of a thioester and a phosphite said stabilized poly(vinylmethylether) having a carbonyl index of less than about 2.9 after exposure to temperatures of up to 350° F. for periods up to 80 hours, as determined by the ratio of the infrared absorbance of carbonyl groups at 1750 cm$^{-1}$ to the infrared absorbance of carbon-hydrogen groups at 3450 cm$^{-1}$ measured by an infrared spectrometer.

8. A hot-melt adhesive composition which comprises the adhesive promoter composition of claim 7, a thermoplastic resin selected from the group consisting of $C_2$ to $C_6$ polyolefins, and copolymers thereof, polystyrene block copolymers, ethylene vinyl acetate copolymers, and petroleum resins, the secondary antioxidant comprising an organic compound of sulfur and trivalent phosphorus wherein said secondary antioxidant is present in a ratio within the range of from about 10:90 wt. % to about 75:25 wt. %, secondary antioxidant to polymerized 1,2-dihydro-2,2,4-trimethylquinoline, and a tackifier resin selected from the group consisting of terpene resins, terepene-phenol resins, coumarone-indene resins, aliphatic and aromatic petroleum resins, hydrogenated petroleum resins, resins made by copolymerization of pure aromatic monomers, a wood rosin, and wood rosin esters.

9. The secondary antioxidant of claim 8 wherein said antioxidant is selected from the group consisting of distearyl thiodiproprionate, tris-(2,4-di-tert-butylphenyl) phosphite, tris(mono-nonylphenyl) phosphite, bis(2,4-di-tert-butylphenyl) pentaerythritol diphosphite, distearyl pentaerythritol phosphite, and mixtures thereof.

10. A bonded structure comprising the adhesive of claim 8 and a solid substrate selected from the group consisting of Kraft paper, burlap, glass, metals, high density polyethylene, low density polyethylene, polypropylene, ethylene-propylene copolymers, polymethylpentene, latex-backed carpet, polyethylene-backed carpet, high impact polystyrene, polyethylene terephthalate, poly(2,6-methyl-phenylene oxide) and blends thereof with polystyrene, and a copolymer of acrylonitrile, butadiene and styrene.

11. A bonded structure comprising the adhesive of claim 8 and a polyethylene substrate.

12. A bonded structure comprising the adhesive of claim 8 and a polypropylene substrate.

13. A bonded structure comprising the adhesive of claim 8 and an ethylene-propylene copolymer substrate.

* * * * *